United States Patent [19]

Bachner et al.

[11] Patent Number: 4,761,156

[45] Date of Patent: Aug. 2, 1988

[54] APPARATUS FOR FORMING A DENESTING LIP ON PAPERBOARD CONTAINERS

[75] Inventors: Jerry G. Bachner, Algonquin; Larry G. Bachner, Barrington; John Hose, McHenry, all of Ill.

[73] Assignee: Nimco Corporation, Crystal Lake, Ill.

[21] Appl. No.: 1,757

[22] Filed: Jan. 9, 1987

[51] Int. Cl.[4] .............................................. B31B 1/64
[52] U.S. Cl. ..................... 493/133; 493/141; 493/158; 493/183
[58] Field of Search ............... 493/133, 134, 141, 143, 493/175, 176, 183, 129, 151, 157, 308, 158

[56] References Cited

U.S. PATENT DOCUMENTS

| | | | |
|---|---|---|---|
| 2,446,798 | 8/1948 | Vergobbi | 493/474 |
| 2,745,323 | 5/1956 | Monroe et al. | 493/141 |
| 3,039,368 | 6/1962 | Simpson | 493/158 |
| 3,229,595 | 1/1966 | Waycie | 493/158 |
| 3,547,012 | 2/1969 | Amberg et al. | 493/158 |
| 3,971,300 | 7/1976 | Bachner | 493/133 |
| 4,302,275 | 11/1981 | Burmeister et al. | 493/474 |
| 4,498,585 | 2/1985 | Gordon et al. | 206/519 |
| 4,601,425 | 7/1986 | Bachner | 229/179 |

FOREIGN PATENT DOCUMENTS

987633 3/1965 United Kingdom ............... 493/133

Primary Examiner—Frederick R. Schmidt
Assistant Examiner—Robert L. Showalter
Attorney, Agent, or Firm—Kirkland & Ellis

[57] ABSTRACT

Apparatus for forming a denesting lip in paperboard containers by folding, heating, and sealing or tacking a side extension flap to form a denesting lip for nested stacks of such containers. The denesting apparatus includes a pair of pressure pads which guide the paperboard container onto the apparatus and prevent the container from sliding off the apparatus while the denesting operation is performed. The apparatus also includes a multiplanar mandrel pad for forming a bottom closure that is flat on its exterior surface.

14 Claims, 4 Drawing Sheets

APPARATUS FOR FORMING A DENESTING LIP ON PAPERBOARD CONTAINERS

BACKGROUND OF THE INVENTION

1. Technical Field

This invention relates generally to an apparatus for forming plastic-coated paperboard containers, and is particularly concerned with an apparatus for forming and sealing a denesting flap extension into a denesting lip or skirt on nestable or stackable, plastic-coated paperboard containers. The purpose of the denesting lip is to facilitate the removal of each individual container taken from a nested stack of such containers. More particularly, this invention relates to an automatic apparatus for breaking or folding a flat container blank, forming it into a container, and sealing the bottom of the paperboard container while also breaking, forming and sealing the denesting lip on one side at the top end of the container.

2. Background Art

In the packaging of fluids such as milk, juices, soups and soft drinks as well as certain powders and other items, extensive use has been made of containers formed of paperboard sheet material having an overall coating of thermoplastic film, such as polyethylene applied on both surfaces of the sheet. This plastic coated paperboard is impervious to moisture and is particularly suitable for use in the packaging of such liquids. The thermoplastic coating not only serves to moisture proof the walls of container, but also can be utilized for sealing the seams of the container. This sealing action can be accomplished by heating the surfaces to be sealed ultrasonically or otherwise, and then pressing the surfaces tightly together to form a liquid tight, plastic-to-plastic bond. Machines for forming, filling and sealing such containers are known in the art. One method and device for sealing the bottom of such containers is illustrated in U.S. Pat. No. 4,601,425 issued to Bachner and entitled "Nonwicking Bottom Closure for a Liquid-tight Container."

The focus of the present invention is an apparatus for forming and sealing a denesting lip in paperboard containers having a generally truncated, tapered form. The present invention is adapted to be used with prior art machines that form, fill and seal paperboard containers. A container having such a denesting lip or skirt is illustrated in U.S. Pat. No. 4,498,585 to Gordon et al. This type of container, with a denesting lip, is particularly appropriate for fast food restaurants, delicatessens or other food and beverage outlets wherein containers need to be taken one at a time from a nested stack readily without their locking or sticking together. It also will be recognized that use of this invention is not limited to tapered containers having trapesoidal sides, but may be used for any container configuration (i.e., tapered or untapered, and having a round, curved or polygonal cross-section) having one end open so that a plurality of such cartons may be stacked or nested, one partially inside the other.

One object of the present invention is to provide an automatic apparatus for forming and sealing, from a denesting flap extension on a carton blank, a denesting lip or skirt on containers of the type illustrated in U.S. Pat. No. 4,498,585. Another object of the present invention is to form the denesting lip at the same time that another portion of this apparatus is forming the paperboard container into its three dimensional shape and sealing the bottom of the paperboard container. Another object of this invention is to form a smooth, flat surface on the bottom of the container. Another object of the present invention is to use the same sealing means, whether ultrasonic, radient heat or hot or cold adhesives, to seal both the denesting lip and the bottom opening of the paperboard container. A further object of the present invention is to provide spring-loaded pressure pads to prevent the paperboard container from slipping down while the denesting lip is being formed, thus ensuring denesting lips of uniform size and configuration.

SUMMARY OF THE INVENTION

A denesting lip or skirt in a generally truncated, tapered paperboard container is formed by folding, heating and applying pressure to a denesting flap extension which comprises a portion of the carton blank from which the container is formed. The partially formed container with both ends open is inserted upward over a mandrel assembly until the top of two opposite container walls abut against the bottom of a top stop clamp mounted on the top of the mandrel assembly. While the lower portion is folded, heated and sealed to form the bottom of the container, the denesting lip is formed by first breaking and folding a denesting flap extension approximately 90° outwardly away from the body of the container into engagement by a hook member on the top stop clamp, heating the denesting flap extension and the container wall just below it, and then folding the denesting flap extension approximately another 90° downward so that two areas of the extension abut with the outer surface of a wall of the container. This latter folding operation is accomplished in the preferred embodiment by a set of three rollers rotatably mounted on a common axle and all three of which are pivotably mounted so that they can be pivoted conjointly into and out of engagement with the denesting flap extension. The hook member on the top stop clamp has three slots that expose the top (initially on the inside surface of the carton blank, but which becomes the outside surface of the denesting lip when folded) of the denesting flap extension. After the denesting flap extension and the container wall have been heated sufficiently to soften the thermoplastic coating, the three rollers are pivoted into the three respective slots in the top stop clamp and into engagement with the denesting flap extension. As the rollers are pivoted farther the denesting flap extension is folded over against the outer surface of the container wall. A carton anvil plate on the mandrel assembly is positioned on the inside of the partially formed container to support the container wall and the denesting flap extension. The two outer rollers thereby press the two respective areas of the denesting flap extension against the container wall and the carton anvil plate, causing the two areas of the denesting flap extension to bond to the container wall. The middle roller is smaller in diameter than the other two so that it folds and guides the middle portion of the denesting flap extension without causing that portion of the denesting flap extension to engage and become bonded to the container wall. The three rollers are then pivoted back to their starting position out of engagement with the container. Thus, the ends and middle portion of the denesting flap extension are unattached and bulge outward due to the natural resiliency of the paperboard, forming the denesting tab.

In addition, a pair of pressure pads are mounted to project inside of the partially formed container on the mandrel assembly. These pressure pads guide the container onto the mandrel assembly and, by exerting an outward force on two opposite inside walls of the container, prevent the tapered container from slipping down on the mandrel assembly while the denesting lip is being formed. The pressure pads are adjusted to hold the partially formed tapered container at the desired elevation.

While the denesting lip is being formed at the top opening of the container, the bottom opening of the container is folded and sealed by a sealing plate and mandrel pad, resulting in a smooth, flat outer surface on the bottom of the container. The same heat source used to heat the bottom of the container is used to heat the denesting lip in the preferred embodiment. For example if radient heat is used, a portion of the heat can be diverted by a duct from the bottom of the container and directed to the denesting flap extension. While the preferred embodiment of this invention envisions the use of a single heat source, those skilled in the art will recognize that separate heat sources also can be used for the bottom area and the denesting lip area without departing from the spirit and scope of the claimed invention. In other alternative embodiments, heating can be done ultrasonically or the two areas of the denesting flap extension can be attached or sealed to the outer surface of the container wall by depositing any suitable hot or cold adhesive on the two areas and/or on the outer surface of the container wall before pressing the two areas against the outer surface of the container wall.

Other objects and advantages of the present invention will become apparent as the following description proceeds in connection with the accompanying figures.

DETAILED DESCRIPTION OF THE INVENTION

Figure 1:
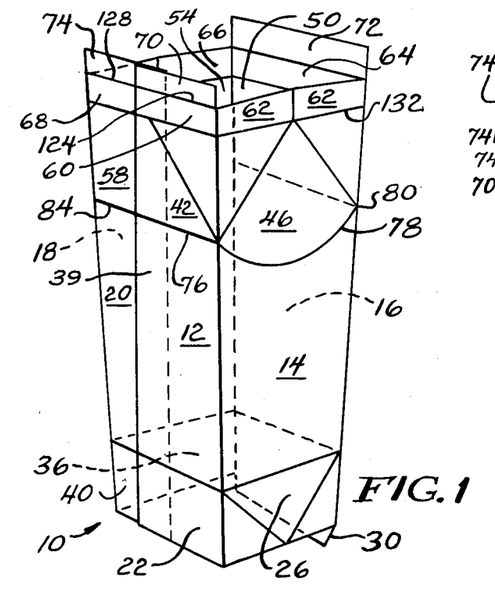
FIG. 1 is a perspective view of the partially formed container from which the denesting lip is formed by the present invention.

Referring now to FIG. 1 of the drawings, there is shown an illustrative container 10 formed of thermoplastic coated paperboard. The container 10 is of generally truncated, tapered prismatic form of the type, for example, described in U.S. Pat. No. 4,498,585 issued to Gorden et al. The apparatus of the present invention is suitable for use to form tapered cartons having denesting lips of the type described in the Gorden et al. patent, the specification of which is hereby incorporated by reference. As described in greater detail in the Gorden et al. patent, denesting paperboard container 10 is formed from a flat, one-piece carton blank (not shown). Container 10 is comprised of side wall 12 and 20 (the side including the overlap of ends 12 and 20 of the carton blank) and side wall 16, end walls 14 and 18, bottom closure panels 22 and 40, and 26, 30 and 36, top closure panels 46 and 54, inclined roof panels 42, 58 and 50, rib panels 60 and 68, and 62, 64, and 66, first side extension flap 72, and second side extension flap comprised of members 70 and 74 (which is formed into the denesting lip). Extension flap 72 is adapted to form in cooperation with the second side extension flap 70 and 74 the top closure for container 10, either as a conventional heat-sealed type of closure or by employing a conventional plastic clip (as shown in FIG. 6 of the Gorden et al. patent).

Figure 2:
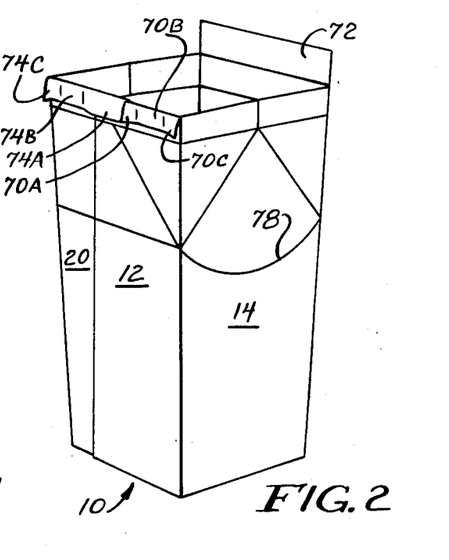
FIG. 2 is another perspective view of the container after the denesting lip is formed and the bottom of the container has been closed.
Figure 3:
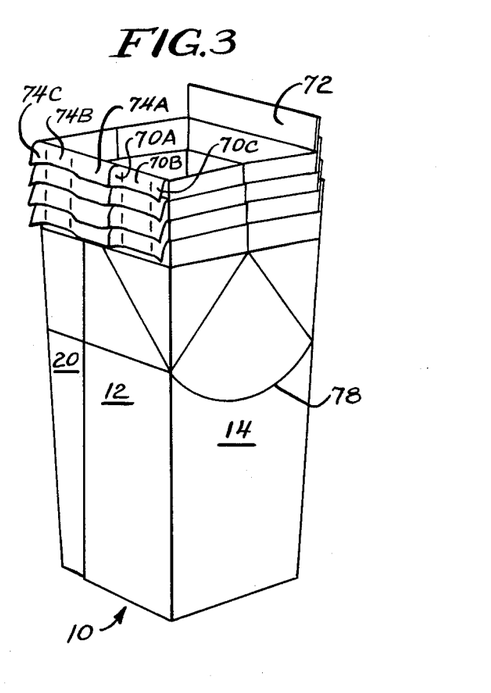
FIG. 3 is a perspective view of a stack of four containers having denesting lips of the type formed by the present invention.
Figure 4:
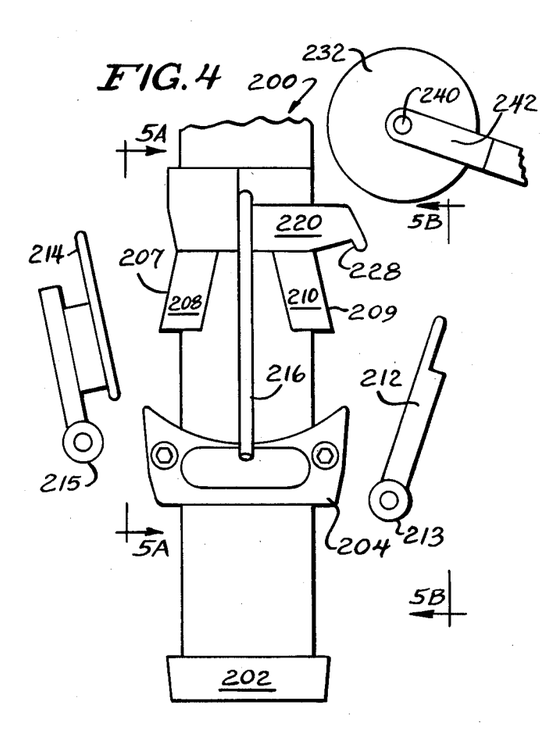
FIG. 4 is a side view of the apparatus of the present invention for forming the denesting lip.

Referring now to FIG. 2, which illustrates the configuration of container 10 after the formation of the denesting lip or skirt, the denesting lip is comprised of endmost portions 70C and 74C and central portions 70A and 74A. The denesting lip or skirt is formed by bending the second side extension flap 70, 74 approximately 180 degrees to a position substantially in parallel with the wall surface defined by side wall 12 and 20. Portions 70B and 74B are tacked to the surface of rib panel 60 at the top of side walls 12 and 20, respectively, forming a bulged skirt or abutment lip at central portion 70A, 74A (between tacked portions 70B and 74B) and at endmost skirt portions 70C and 74C. The natural resiliency of the paperboard causes skirt portions 70C, 70A, 74A, and 74C to remain in an outwardly flared position. When nested or stacked as shown in FIG. 3, the denesting lip of the containers prevents each of the containers from traveling so far down into the interior of the next lower container as to inhibit a later rapid and clean removal of each container from the adjacent ones in the stack.

Figures 5A, 6A, 6B, 7:
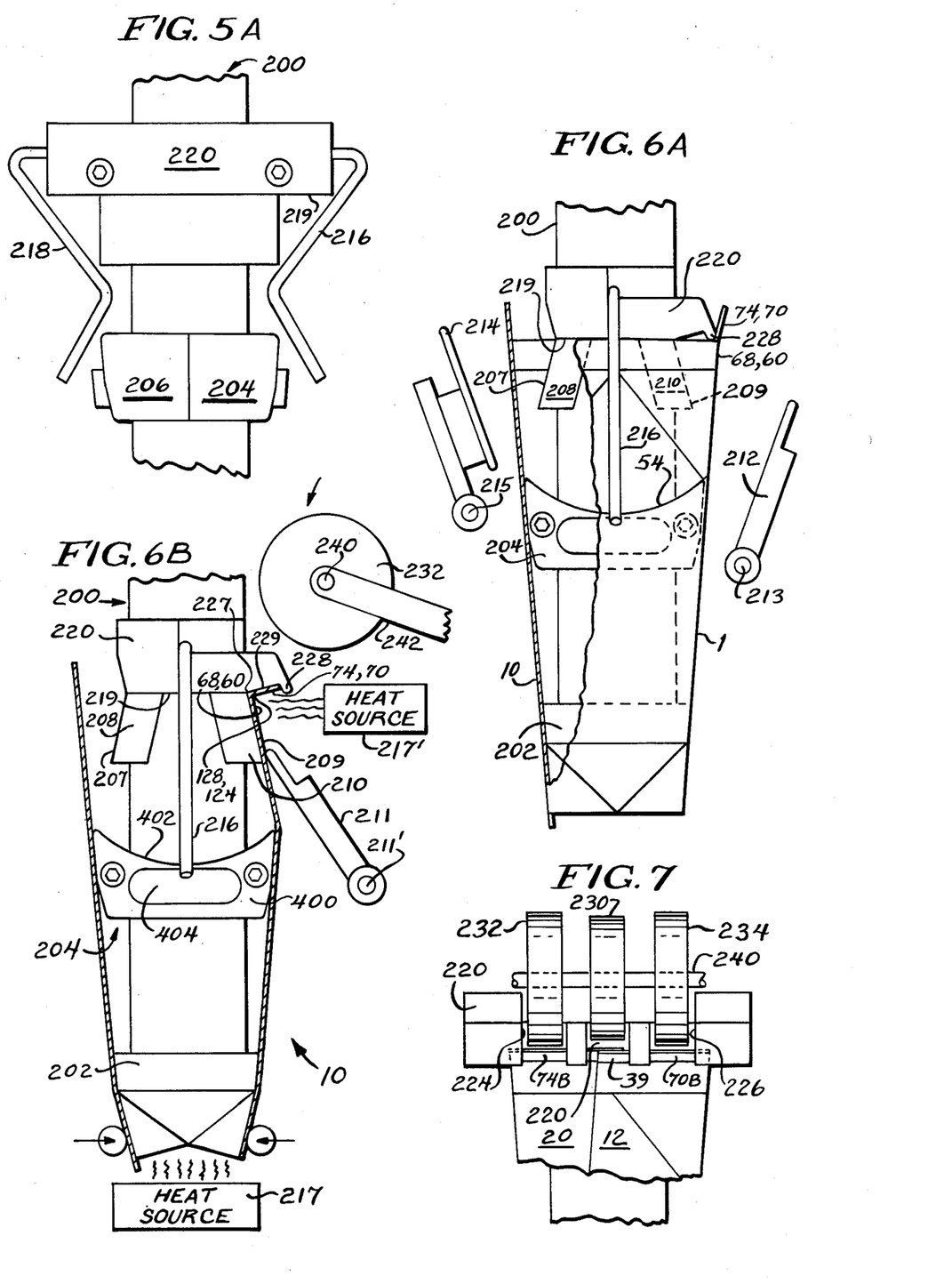
FIG. 5A is a side view of the upper portion of the apparatus for forming a denesting lip looking along line 5A—5A in FIG. 4.
FIG. 6A illustrates the denesting apparatus of FIG. 4 with the container shown in FIG. 1 mounted on it.
FIG. 6B illustrates the denesting apparatus of FIG. 4 with the denesting flap extension being heated after being folded 90°, and with the opening at the bottom of the container partially folded and in position for being heated.
FIG. 7 is a side view of the pressure roller sealing assembly of the present invention looking in the direction 5B—5B in FIG. 4 during formation of the denesting lip.

Referring now to FIGS. 4, 5, 6A, 6B and 6C, it will be seen that the denesting tab apparatus includes a mandrel assembly 200. The mandrel assembly 200 includes a mandrel pad 202, a pair of spring-loading pressure pad subassemblies 204 and 206, carton anvil members 208 and 210 breaker members 212 and 214, a pair of transverse side forming rods 216 and 218, and a top stop clamp 220. Breaker members 212 and 214 are pivotably mounted about axes 213 and 215, respectively, such that in their rest position they do not contact container 10 mounted on mandrel assembly 200. During formation of container 10, breaker members 212 and 214 are pivoted by suitable, conventional means (not shown) against the roof panels of container 10, as described below. Near top stop clamp 220 is a heat source 217' (see FIG. 6B) for heating the side extension flap 70, 74 while it is being retained by hook 228 of top stop clamp 220 with score lines 124, 128 being positioned in corner 227 between carton anvil 210 and retaining surface 229 of hook 228. As shown in FIGS. 6A and 7, one side of top stop clamp 220 has three openings or slots 222, 224 and 226, and a hook portion 228. The slots 222, 224 and 226 receive, respectively, rollers 230, 232 and 234. Roller 230 is pivoted through slot 222 to contact seam area 39 during formation of the denesting lip. Rollers 232 and 234 are pivoted through slots 224 and 226 to engage the middle portion of the denesting lip on either side of seam area 39 during formation of the denesting lip. The diameter of roller 230 (see FIG. 7) is slightly smaller than the diameter of rollers 232 and 234 so that roller 230 contacts the seam area 39 of the container and guides seam area 39 without causing seam area 39 to contact the outer wall surface of rib panel 60, 68, which is on the top of side panel 12, 20. This prevents central portion 70A, 74A from being bonded to rib panel 60, 68 and permits it to bulge outwardly.

As the carton blank that is to be formed into container 10 is pushed upward onto mandrel assembly 200, side forming rods 216 and 218 force top closure panels 46 and 54 inward along arcuate score lines 78 and 82, respectively. Side forming rods 216 and 218 also help align and guide the carton blank as it is inserted onto mandrel assembly 200 and to retain the carton blank in position. The carton blank is inserted upward over mandrel assembly 200 until the top edges of rib panels 62 and 66 (see FIG. 1) abut against the bottom surface 219 of top stop clamp 220 (see FIGS. 5A, 6A, 6B and 6C).

Figures 5B, 6C, 8:
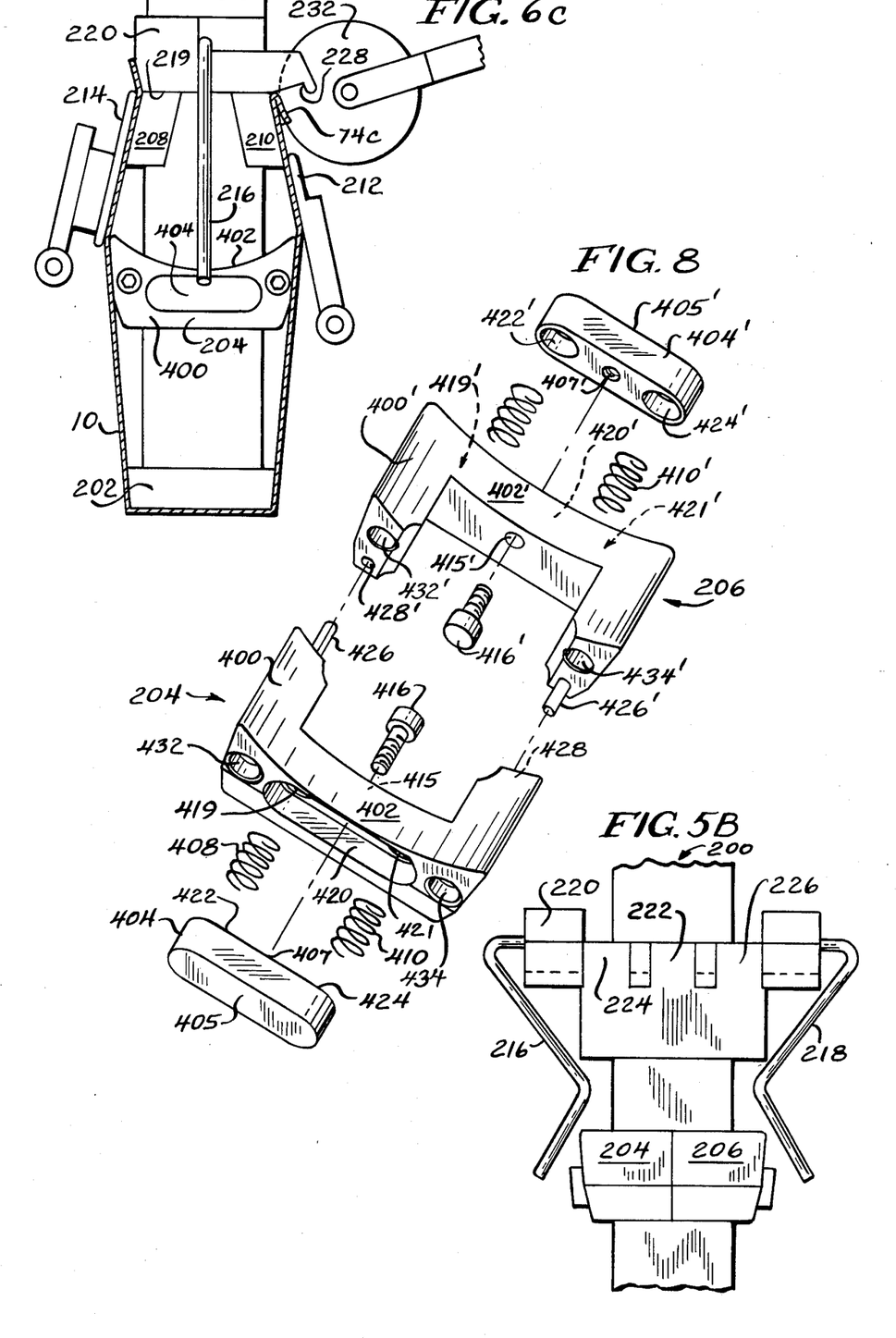
FIG. 5B is a side view of the upper portion of the apparatus for forming a denesting lip looking along line 5B—5B in FIG. 4.
FIG. 6C illustrates the configuration of the denesting apparatus during formation of the denesting lip.
FIG. 8 is an exploded view of the pressure pads of the present invention.

With reference to FIGS. 6C and 8, pressure pad subassemblies 204 and 206 are the mirror image of each other. Therefore, only pressure pad subassembly 204 will be described in detail, with the corresponding parts of pressure pad subassembly 206 being designated by the same numerals followed by a prime symbol. Pressure pad subassembly 204 includes base member 400 in which is mounted pressure pad 404. Base member 400 has an upper, arcuate shaped surface 402 configured to align with arcuate score line or fold line 78 at the top of end wall 14. (In alternative embodiments, surface 402 can have configurations other than arcuate so as to align with non-arcuate score lines 78, which would be used in other carton configurations.) Arcuate surface 402' of base member 400' similarly aligns with score line or fold line 82 at the top of end wall 18. Thus, arcuate surfaces 402 and 402' retain end walls 14 and 18, respectively, against collapse when top closure panels 46 and 54 are pushed inward by side forming rods 216 and 218, respectively, as the carton blank is slid upwardly onto mandrel assembly 200. Base member 400 includes a recess 420 that is configured to receive pressure pad 404. Recess 420 includes two further recesses 419 and 421 that are configured to receive one end of compression springs 408 and 410, respectively. Pressure pad 404 includes two recesses 422 and 424 that are configured to receive the other end of compression springs 408 and 410, respectively. Finally, in the preferred embodiment, pad member 404 includes a tapped hole 407 for receiving threaded screw 416, which passes through hole 415 in base member 400. In the preferred embodiment, base member 400 includes an alignment post 426 and an alignment hole 428, which is received by or which receives, respectively, alignment hole 428' and alignment post 426' in base member 400'. Pressure pad subassemblies 204 and 206 can be fastened together by bolts (not shown) passing through holes 432, 432' and 434, 434'.

As screw 416 is threaded into tapped hole 407, springs 408 and 410 are compressed as pressure pad 404 is drawn into recess 420. Further movement of pressure pad 404 into recess 420 is possible by applying a force to outer surface 405, but inward movement is resisted by the bias of springs 408 and 410. Base members 400 and 400' and pressure pads 404 and 404' are configured such that as a partially formed carton 10 is inserted over pressure pads 404 and 404', springs 408 and 410 are slightly compressed, thereby causing pressure pads 404 and 404' to exert an outward pressure against the inside surface of end walls 18 and 14, respectively, In this way the pressure exerted by pressure pads 404 and 404' increases the friction between them and end walls 18 and 14, respectively, which causes partially formed carton 10 to resist further downward movement on mandrel assembly 200 (further upward movement is prevented by abutment with surface 219 of top stop clamp 220). Thus, once the partially formed carton blank 10 is initially positioned properly on mandrel assembly 200, pressure pad subassemblies 204 and 206 hold it in the proper position while the carton bottom is sealed and the denesting lip is formed. This is important because otherwise partially formed carton 10 has a tendency to slip downward as a result of the tapered configuration of the carton 10 and because the partially formed carton expands slightly as it is heated prior to the sealing operations, which are described below. Upward or downward movement of the partially formed carton 10 causes undesirable variations in the configuration of the denesting lip. Accordingly, pressure pad subassemblies 204 and 206 assure that the denesting lips have a uniform configuration from carton to carton, thereby enhancing their appearance and their stacking and unstacking characteristics.

When the carton blank is initially placed on mandrel assembly 200, side extension flap members 70, 74 rest outside top stop clamp 220 adjacent to hook 228, as illustrated in FIG. 6A. Roof panel 42, 58 and extension flap 70, 74 then are pushed inward sufficiently by the pivoting of breaker member 211 about axis 211' (or breaker member 212 can be used if this step is carried out while mandrel assembly 200 is positioned in the vicinity of breaker members 212 and 214; however, breaker members 211 and 212 need not be the same member) to cause extension flap 70, 74 to bend approximately 90° along score lines or fold lines 124, 128, and to snap under hook 228, as shown in FIG. 6B. Heat from source 217' is then applied to the vicinity of extention flap 70, 74 and rib panel 60, 68 and from source 217 to the vicinity of the bottom panels to partially melt the thermoplastic coating prior to the sealing operations. As noted above, heat sources 217 and 217' can be a common source or separate sources of heat. Alternatively, ultrasonic or other types of heating can be used or the surfaces can be joined by suitable hot or cold adhesives without departing from the spirit or scope of the present invention. After the foregoing areas of the carton blank that comprise the denesting lip have been heated sufficiently, the denesting lip is formed, as described below.

To form the denesting lip, breaker member 212 is pivoted about its axis 213 by suitable, conventional means causing it to contact the outside surface of inclined roof panel 42, 58, thereby folding it along score line 76, 84 and moving it into contact with outside surface 209 of carton anvil plate 210, which supports roof panel 42, 58. In the preferred embodiment, breaker member 214 is simultaneously pivoted about axis 215 against roof panel 50 to fold it along score line 80 and move it into contact with outside surface 207 of carton anvil plate 208 in preparation for sealing the top of the container. Also, additional folding occurs simultaneously along score lines 78, 82 and the interconnected score lines associated with the end panels. Simultaneously with the pivoting of breaker member 212, rollers 230, 232 and 234 are rotably mounted on shaft 240 by suitable conventional means, and shaft 240 is mounted on the end of arm 242, the other end of which is pivotably mounted by suitable conventional means (not shown). Arm 242 and rollers 230, 232 and 234 are configured and mounted such that when arm 242 is pivoted downward by suitable conventional means, rollers 230, 232 and 234 engage side extension flap 70, 74 through slots 222, 224 and 226 of top stop clamp 220, and rollers 232 and 234, which have a greater diameter than roller 230, fold portions 74B and 70B of extension flap 70, 74 another 90° and into engagement with rib panel 60, 68. Rollers 232 and 234 thereby press portions 74B and 70B against rib panel 60, 68 and against surface 209 of carton anvil plate 210. Because of the heating of side extension flap 70, 74 and rib panel 60, 68 by the heating source 217', the thermoplastic coating is partially melted and the pressure exerted by rollers 234 and 232 causes the denesting lip portions 70B and 74B, respectively, on either side of seam area 39 to be bonded to rib panels 60 and 68. In alternative embodiments, the necessary tack force for pressing portions 70B and 74B against rib panels 60 and 68 can be provided by members other than rollers, such as curved members (not shown) that swing into contact with portions 70B and 74B or contact members (not shown) that move substantially perpendicularly to surface 209 into contact with portions 70B and 74B and away again. In other alternative embodiments, other means for bonding regions 70B and 74B to rib panels 60 and 68 can be used without departing from the spirit of the present invention. For example, a cold or hot-melt type adhesive could be applied by suitable means before applying pressure instead of heating a thermoplastic coating.

Figure 11:
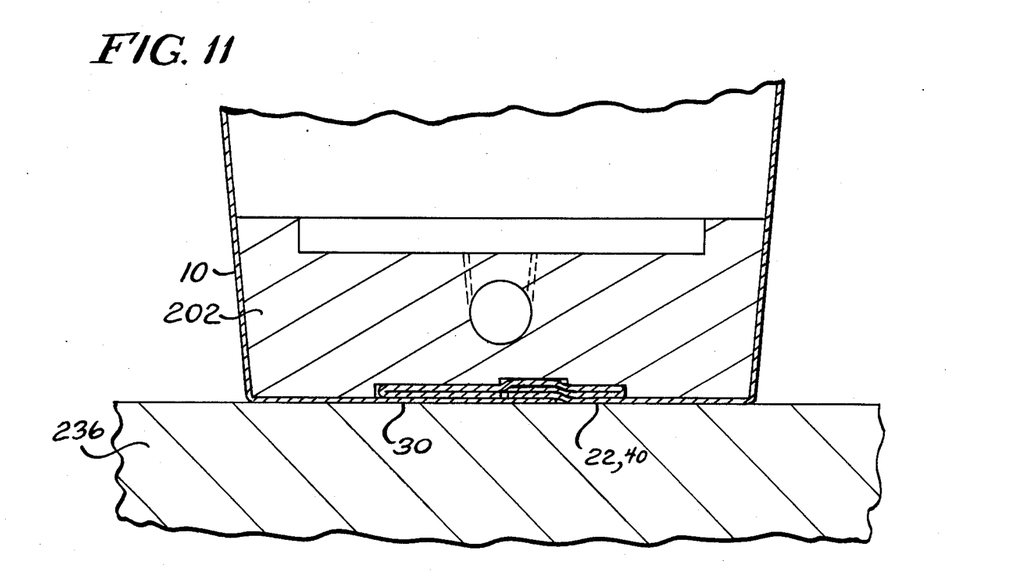
FIG. 11 is a cross-sectional view of the multiplanar mandrel pad, carton bottom, and the sealing plate during their forcible engagement.

Container 10 is mounted over mandrel assembly 200 such that the bottom closure panels 22 and 40, and 26, 30 and 36 are properly aligned with the bottom surface of mandrel pad 202. Closure of the bottom portion of container 10 is accomplished in a conventional manner by folding bottom closure panels 26, 36, 22 and 40, and 30 as illustrated schematically in FIGS. 1 and 6B. Conventional heat source 217 is used to heat the thermoplastic coating on the bottom panels before pressing them together between multiplanar, multi-surface mandrel pad 202 and sealing plate 236 (see FIG. 11). The bottom sealing used in the present invention is similar to that described in U.S. Pat. No. 3,971,300 issued to Bachner and entitled "Apparatus for Ultrasonically Sealing of Non-Uniform Folded Carton Bottom Closure," the specification of which is hereby incorporated by reference. Significantly, however, in the present invention only the mandrel pad 202 is multiplanar, and the surface of sealing plate 236 that contacts the bottom panels is flat and lies in one plane.

Figure 9:
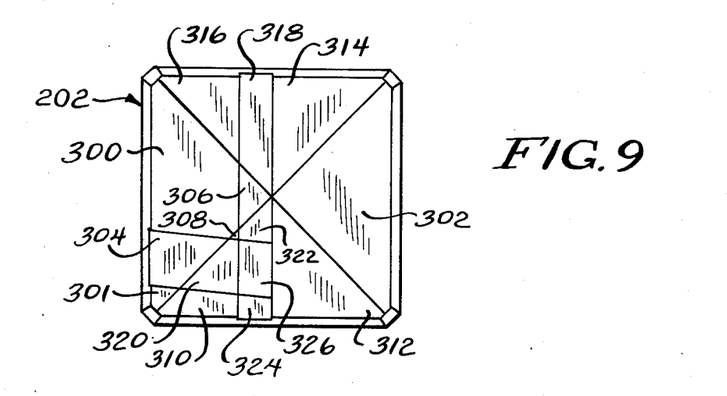
FIG. 9 is a top plan view of the face of the multiplanar mandrel pad.
Figure 10:
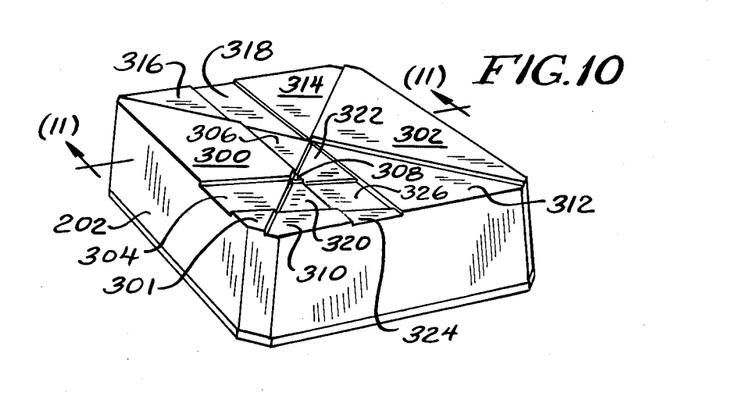
FIG. 10 is a perspective breakaway view of the multiplanar mandrel pad.

As shown in FIGS. 9 and 10, mandrel pad 202 has outer surfaces 300 and 302, second surfaces 304 and 306 (recessed from the outer surfaces), third surfaces 308, 310, 312, 314 and 316 (recessed from the second surfaces), fourth surfaces 318, 320, 322 and 324 (recessed from the third surfaces), and fifth surface 326 (recessed from the fourth surface). The milled out depth of each of the second, third, fourth and fifth surfaces corresponds to the particular thickness of bottom closure panels 26, 36, 22 and 40, and 30 of the particular paperboard container 10 when the bottom closure panels are folded together. In alternative embodiments, a greater or fewer number of multiplanar surfaces can be used of any appropriate relative elevations, depending upon the configuration of the folds of the bottom closure and the thickness of the paperboard from which the container is formed. When sealed by pressing sealing plate 236, which is flat, the exterior surface of the bottom closure of container 10 is smooth and flat due to the multi-surfaces or recesses of mandrel pad 202 gathering in the bottom folds of container 10 (see FIG. 11). The flatness of the bottom closure is particularly important in tapered containers of the type illustrated in U.S. Pat. No. 4,498,585 to Gorden et al. to provide stability to the container when filled.

Although the invention has been described above by reference to a preferred embodiment, it will be appreciated that variations thereof and other devices may be devised which are, nevertheless, within the scope and spirit of the invention and are defined by the claims appended hereto.

We claim:

1. An apparatus for forming a denesting lip in a partially formed paperboard container having open top and bottom closure portions and one side wall of the top portion of the container having a denesting extension flap, the apparatus comprising:

mandrel means for mounting the partially formed container;

anvil means for supporting a portion of the inside surface of the top closure portion of the container;

breaker means for applying force to the outside surface of the sidewall having the denesting extension flap so as to cause the sidewall and the denesting extension flap to bend inwardly;

top stop means for engaging the inside surface of the denesting extension flap when it is bent inwardly sufficiently by said breaker means so as to cause it to bend outward with respect to the sidewall as the sidewall is bent inwardly farther and for retaining the denesting extension flap in an outwardly bent position while not restraining it from being bent farther outwardly and down toward the bottom closure portion of the container; and bending means for engaging the inside surface of the denesting extension flap while it is retained in an outwardly bent position by said top stop means so as to bend it over farther until its outside surface contacts the outside surface the container in at least two spaced-apart locations such that in the spaced-apart locations the denesting extension flap and the sidewall are pressed together between said anvil means and said bending means and an outward bulge is formed in the bent-over denesting extension flap between the spaced-apart locations.

2. The apparatus as claimed in claim 1 wherein the paperboard container has a coating that becomes adhesive when heated and further comprising heating means for heating the coating of the paperboard container in the area where said bending means causes the denesting extension flap to contact the outside surface of the container such that the denesting extension flap adheres to the outside surface of the container at the spaced-apart locations where engaged by said bending means.

3. The apparatus as claimed in claim 2 further comprising:
   bottom forming means for folding closed the open bottom closure portion of the container, wherein said heating means also heats the bottom closure portion of the container for sealing by said bottom forming means.

4. The apparatus as claimed in claim 3 wherein said bottom forming means forms and seals the bottom closure portion of the container while said bending means is engaging the denesting extension flap.

5. An apparatus according to claim 3 wherein said bottom forming means includes a multi-surface mandrel pad and a flat sealing plate for forming a bottom closure of the container having a flat exterior surface.

6. The apparatus as claimed in claim 1 wherein said mandrel means further comprises:
   pressure pad means for supporting the partially formed container by applying force in an outward direction against the inside surface of at least two opposing sides of the partially formed container.

7. The apparatus as claimed in claim 6 wherein said pressure pad means further comprise compression spring means for providing an outward bias against each of at least two opposing sides of the partially formed container.

8. The apparatus as claimed in claim 1 wherein said top stop means further comprises a hook member for engaging the denesting extension flap when the sidewall is bent sufficiently inwardly by said breaker means so as to cause the denesting extension flap to bend outwardly and for retaining the denesting extension flap in an outwardly bent position, wherein said hook member engages only a portion of the inside surface of the denesting extension flap such that said bending means is engageable with at least a portion of the inside surface of the denesting extension flap that is not engaged by said hook member.

9. The apparatus as claimed in claim 8 wherein said bending means further comprises a pair of rotably mounted, spaced-apart wheels, said wheels being mounted for pivotable movement between a first position on one side of said hook member and a second position on the other side of said hook member and wherein each of said wheels passes by at least a portion said hook member as said wheels are pivoted between the first and second positions.

10. The apparatus as claimed in claim 9 wherein said hook member has a pair of recessed areas and one of said wheels passes through each recessed area in the hook member as said wheels are pivoted between the first and second positions.

11. The apparatus as claimed in claim 9 or 10 wherein said wheels are mounted coaxially.

12. The apparatus as claimed in claim 8 wherein said hook member has at least three recessed areas and wherein said bending means further comprises at least three rotably mounted, spaced-apart wheels, said wheels being pivotably mounted for conjoint movement between a first position on one side of said hook member and a second position on the other side of said hook member and wherein each of said wheels passes through each recessed area in the hook member as said wheels are pivoted between the first and second positions.

13. The apparatus as claimed in claim 12 wherein said wheels comprise a middle wheel located between a side wheel on either side of it, said middle wheel being of smaller diameter than the side wheels so that the area of the denesting extension flap engaged by the middle wheel does not contact the sidewall of the container while the areas of the denesting flap engaged by the side wheels contact the sidewall when said wheels are in the second position.

14. The apparatus as claimed in claim 3 wherein the partially formed container has an opposing sidewall from the one having the denesting extension flap, wherein said breaker means further comprises first and second breaker members movable between first and second positions for engaging, respectively, the outside surface of the sidewall having the denesting extension flap and the outside surface of the opposing sidewall as said first and second breaker members move from their first positions to their second positions, and wherein said bottom forming means, said bending means and said breaker means are adapted so that said bottom forming means forms and seals the bottom closure portion of the container while said first and second breaker members are in their second positions and the denesting extension flap and the outside surface of the container are being pressed together at the two spaced-apart locations between said anvil means and said bending means.

* * * * *

UNITED STATES PATENT AND TRADEMARK OFFICE
CERTIFICATE OF CORRECTION

PATENT NO. : 4,761,156
DATED : August 2, 1988
INVENTOR(S) : Jerry G. Bachner, Larry G. Bachner and John Hose It is certified that error appears in the above-identified patent and that said Letters Patent is hereby corrected as shown below:

IN THE SPECIFICATION:

Column 4, line 64, -- , -- should follow "210";
    Column 6, line 19, "respectively," should read
       -- respectively. --; and
    Column 6, line 56, "extention" should be -- extension --;

IN THE CLAIMS:

Claim 1, line 62, insert -- of -- after "surface".

Signed and Sealed this

Twenty-first Day of February, 1989

Attest:

DONALD J. QUIGG

Attesting Officer      Commissioner of Patents and Trademarks